(12) United States Patent
Holt

(10) Patent No.: US 8,375,592 B1
(45) Date of Patent: Feb. 19, 2013

(54) ADJUSTABLE CONSTRUCTION SQUARE

(76) Inventor: Albert W. Holt, Butternut, WI (US)

( * ) Notice: Subject to any disclaimer, the term of this patent is extended or adjusted under 35 U.S.C. 154(b) by 17 days.

(21) Appl. No.: 13/136,439

(22) Filed: Jul. 30, 2011

(51) Int. Cl.
B43L 7/10 (2006.01)

(52) U.S. Cl. ............. 33/456; 33/464; 33/471; 33/473

(58) Field of Classification Search ........... 33/456, 33/452, 464, 465, 468, 469, 470, 471, 473
See application file for complete search history.

(56) References Cited

U.S. PATENT DOCUMENTS

| X866 | I1 | * | 4/1808 | Dearborn | 33/471 |
|---|---|---|---|---|---|
| 899,692 | A | * | 9/1908 | Clark | 33/471 |
| 912,605 | A | * | 2/1909 | Osmonson | 33/456 |
| 1,040,239 | A | * | 10/1912 | Rarey | 33/456 |
| 1,906,988 | A | * | 5/1933 | McFarland | 33/456 |
| 1,916,638 | A | * | 7/1933 | Rizianu | 33/418 |
| 4,525,933 | A | * | 7/1985 | Patterson | 33/470 |
| 4,955,141 | A | * | 9/1990 | Welch | 33/418 |
| 5,414,938 | A | * | 5/1995 | Meek | 33/452 |
| 5,603,164 | A | * | 2/1997 | Haddix | 33/456 |
| 5,771,767 | A | * | 6/1998 | Itami | 83/435.13 |
| 6,105,267 | A | * | 8/2000 | Hathaway | 33/465 |
| 2003/0217473 | A1 | * | 11/2003 | Pampel | 33/471 |

* cited by examiner

Primary Examiner — Christopher Fulton

(57) ABSTRACT

An adjustable construction square is provided that comprising an elongated blade member and an elongated cross member. An end of the cross member has a contour, and an end of the blade member has a contour. The adjustable construction square includes a clamping jig that enables the construction square to be quickly secured into a desired angular position. The clamping jig includes a clamping device, a wedge device, and an arm that work in combination to secure the adjustable construction square in a desired position.

19 Claims, 7 Drawing Sheets

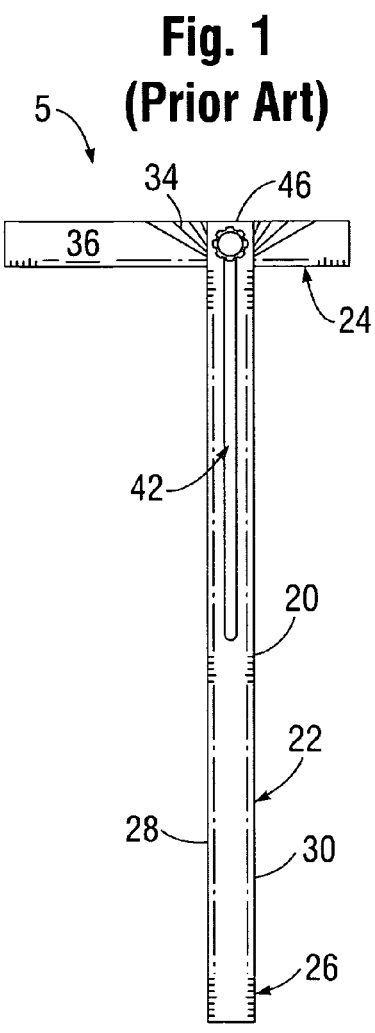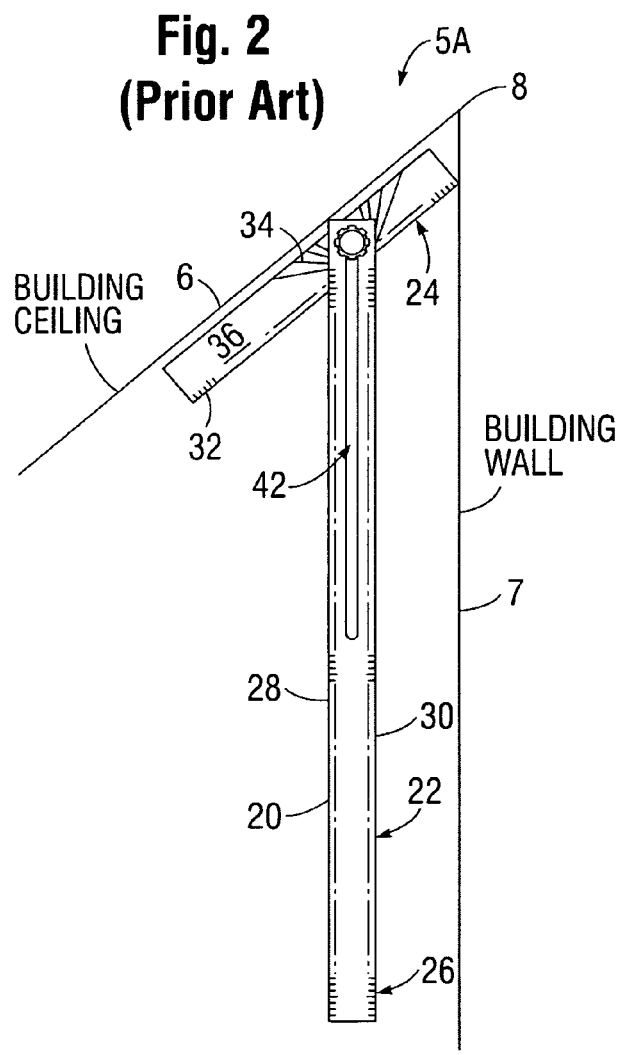

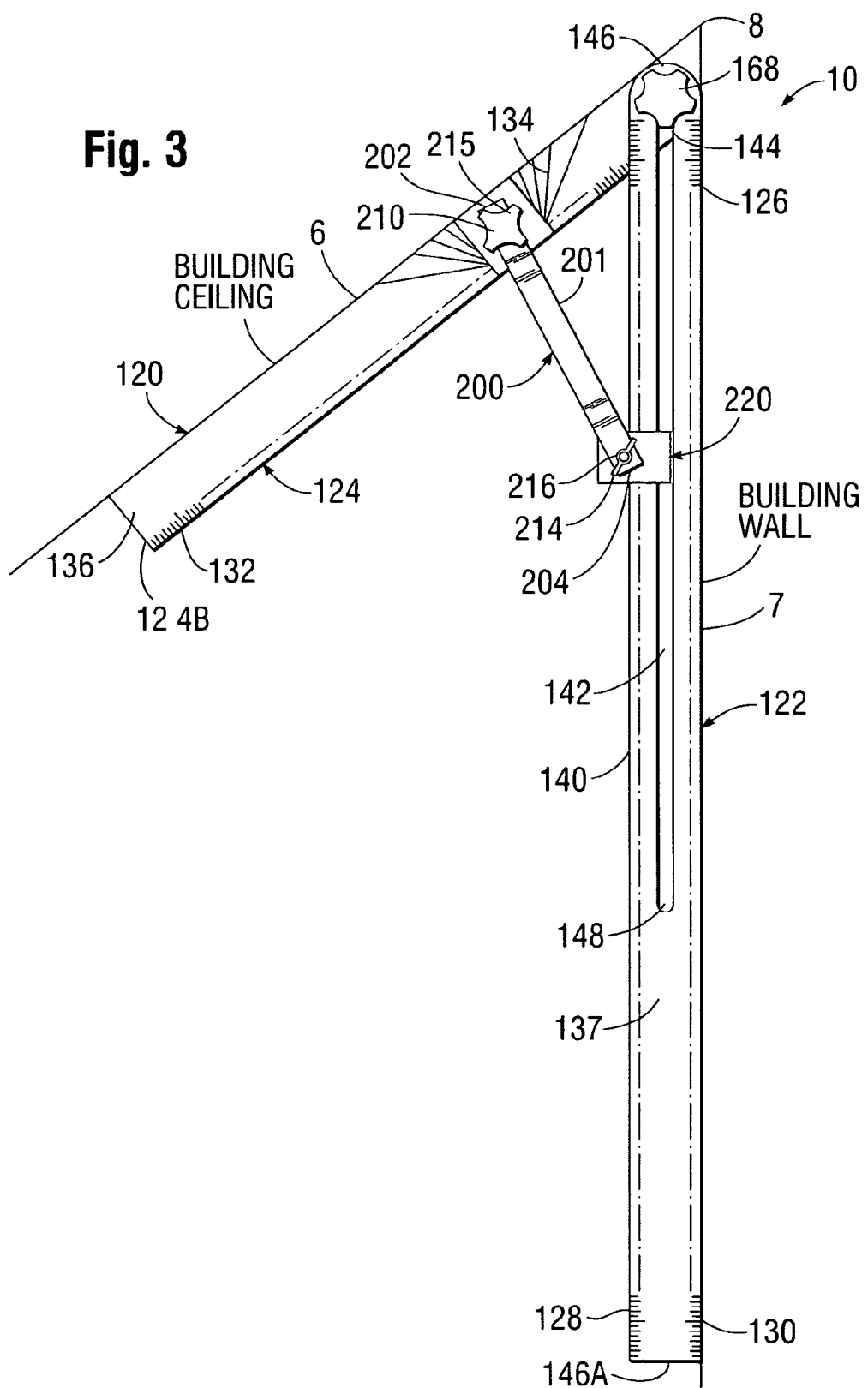

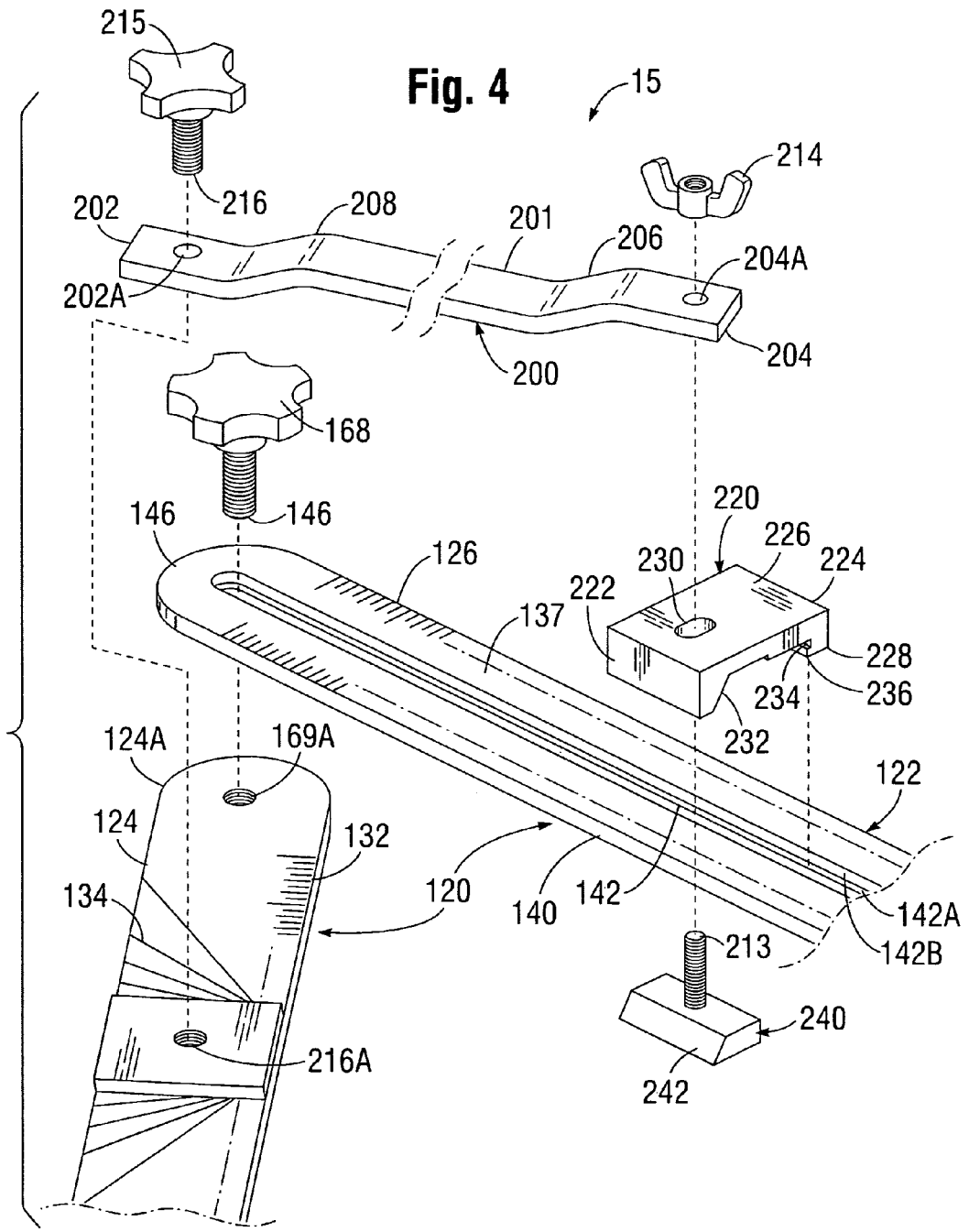

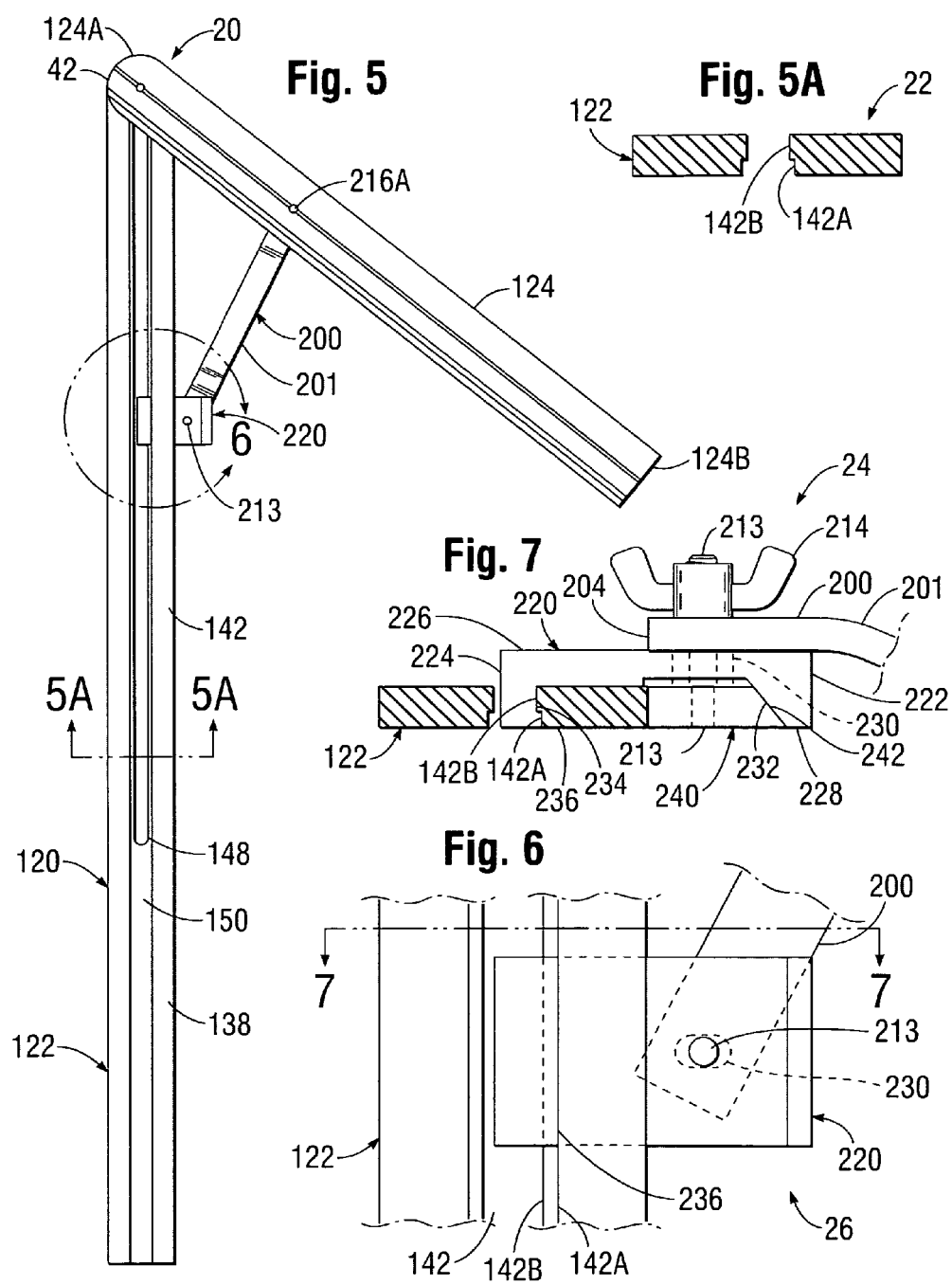

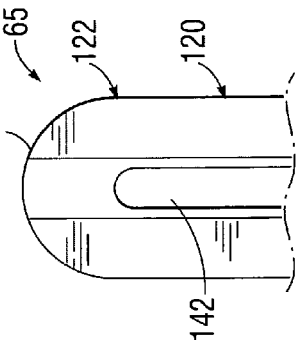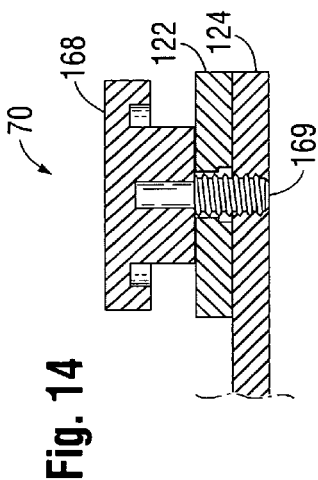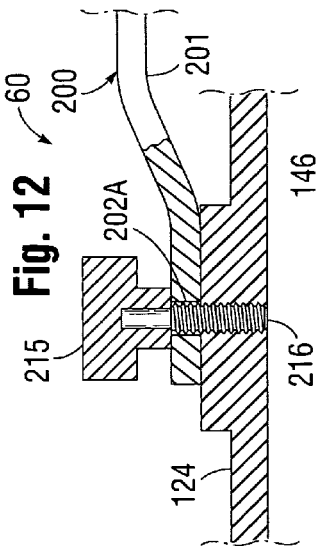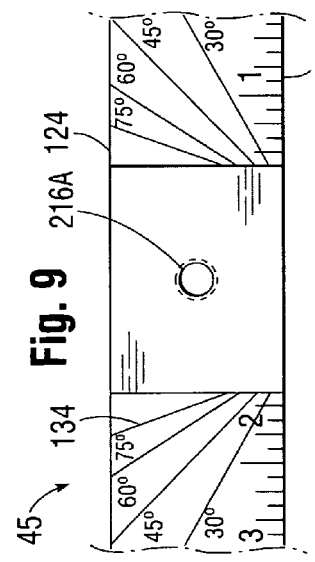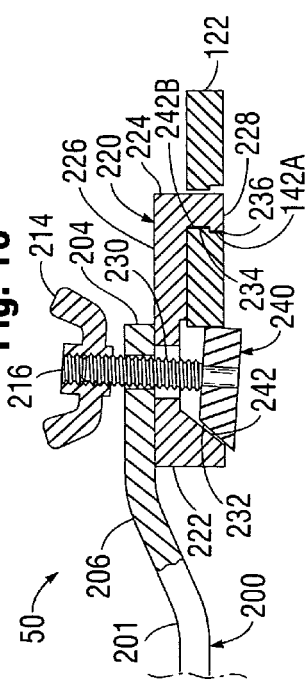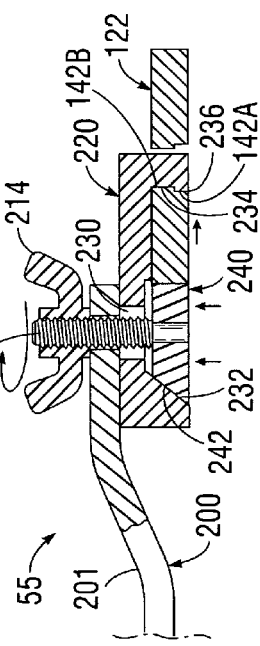

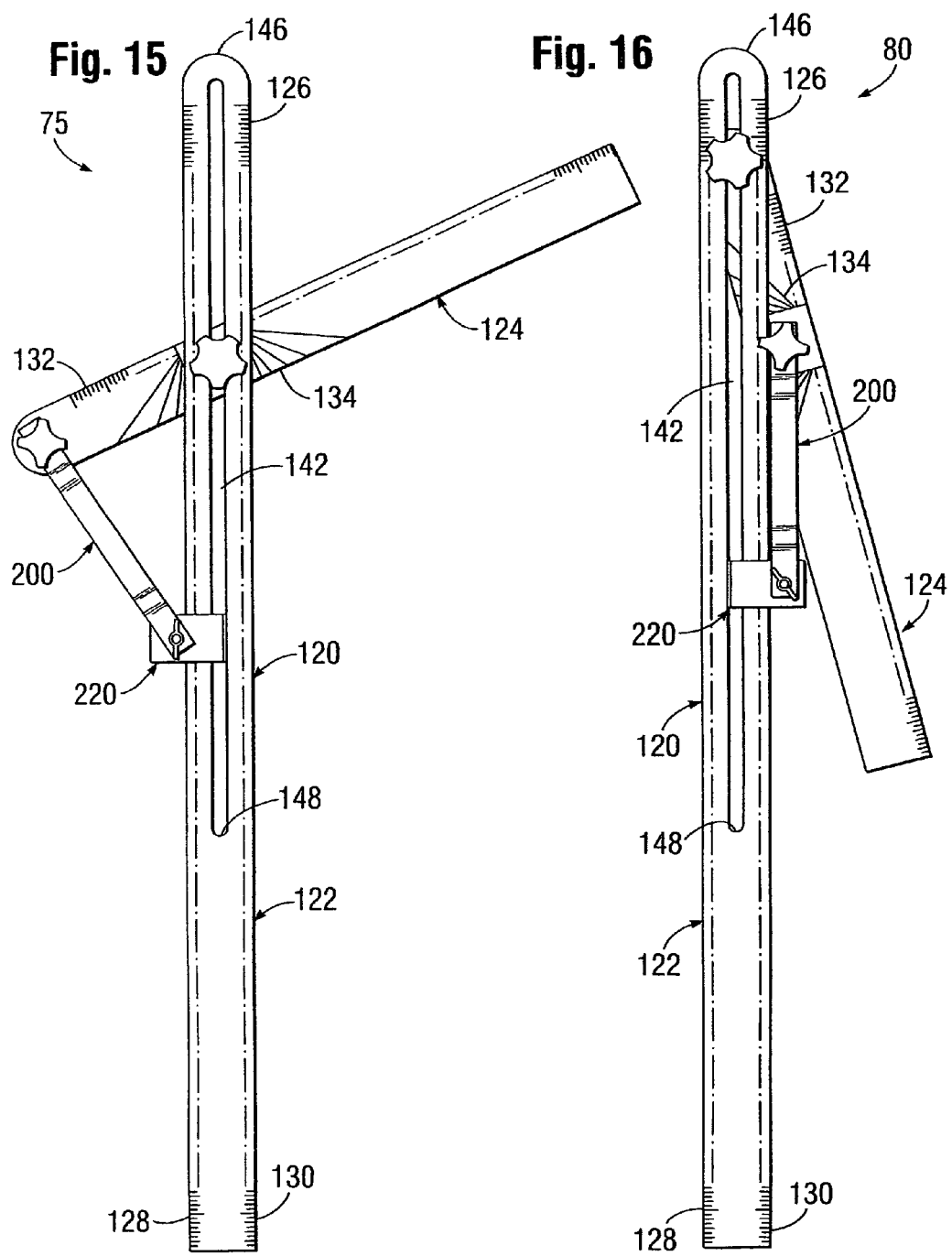

ADJUSTABLE CONSTRUCTION SQUARE

CROSS REFERENCE TO RELATED APPLICATIONS

Not Applicable

FEDERALLY SPONSORED RESEARCH

Not Applicable

SEQUENCE LISTING

Not Applicable

FIELD OF THE INVENTION

The present invention relates to adjustable construction squares having an elongated blades and an elongated cross members. The cross members can be secured to the blades at various positions along the length of the blade. Also the cross members can be secured to the blade at various angles relative to the longitudinal axis of the blades. The adjustable construction squares are useful as a tool for the construction industry. Adjustable construction squares are especially useful for measuring and marking for cutting drywall wall panels. Other applications for adjustable construction squares include measuring and marking for cutting other items such as metal roofing panels.

BACKGROUND OF THE INVENTION

An adjustable construction square is very useful in remodeling and new construction work especially for measuring and cutting drywall wall panels. Typically past adjustable construction square have been in the form of a T-square. The adjustable construction T-square has a blade and cross member with the cross member being adjustable to various angular positions and various positions along the longitudinal axis of the blade. This adjustable feature enables angular measurements and cuts in the drywall panels. This adjustable feature also enables measurements and cuts in the drywall panels for doors and windows and electrical devices such as electrical sockets and switches, etc.

Richard Patterson developed and got a patent on a construction adjustable T-square. His adjustable T-square allows the longitudinal and angular positions of the blade and cross member to be easily adjusted. His U.S. Pat. No. 4,525,933 device was successful in the marketplace and was widely utilized in the construction industry. The Patterson U.S. Pat. No. 4,525,933 adjustable T-square however has some drawbacks. Also, the Patterson U.S. Pat. No. 4,525,933 adjustable T-square cannot be utilized for measurements in certain situations.

One of the drawbacks of the Patterson U.S. Pat. No. 4,525,933 adjustable T-square is that is cannot be utilized to measure angles in certain situations. An example is the top of a ceiling in a room of a building. This will be explained with example drawings.

Another drawback of the Patterson U.S. Pat. No. 4,525,933 adjustable T-square is that when an angular measurement is taken with the adjustable T-square; the adjustable T-square cannot be tightened properly to keep the adjustable T-square in the measured angular position. Any little bump of the adjustable T-square moves adjustable T-square away from the measured angular position.

SUMMARY AND OBJECTS OF THE INVENTION

An adjustable construction square is provided that comprises an elongated blade and an elongated cross member coupled to the blade. The elongated blade has a longitudinal axis and linear measurement indicia on one of its surfaces. The elongated cross member also has a longitudinal axis, and has top and bottom surfaces with measurement indicia on its top surface. An end of the blade member is coupled to an end of the cross member. The end of the blade member that is coupled to an end of the cross member has a contour, and the end of the cross member that is coupled to the blade member has a contour. This arrangement and contoured ends allow accurate measurements in certain construction applications. The adjustable construction square includes a clamping jig that enables the construction square to be quickly secured into a desired angular position. The clamping jig includes a clamping device, a wedge device, and an arm that work in combination to secure the adjustable construction square in a desired position. The clamping jig prevents the construction square from moving once an angular measurement has been made during construction projects.

Accordingly, a primary object of the present invention is to provide an adjustable construction square that overcomes the drawbacks of the Patterson U.S. Pat. No. 4,525,933 adjustable T-square.

It is an object of the present invention is to provide an adjustable construction square that can be utilized to measure angles in many more situations than the Patterson U.S. Pat. No. 4,525,933 adjustable T-square.

It is an object of the present invention to provide an adjustable construction square that can be utilized to measure angles in the top of a ceiling in a room of a building.

It is an another object of the present invention is to provide an adjustable construction square that can be tightened properly to keep the adjustable construction square in the measured angular position. Bumping adjustable construction square will not move adjustable construction square away from the measured angular position.

Another object of the present invention is to provide an adjustable construction square that is generally inexpensive to manufacture.

Another object of the present invention is to provide an adjustable construction square that is generally rugged and will be suitable for the construction industry.

Other objects, advantages and salient features of the present invention will become apparent from the following detailed description which, taken in conjunction with the annexed drawings, discloses a preferred embodiment of the present invention.

As used in this application, the terms "top", "bottom" and "side" are intended to facilitate the description of the adjustable construction square. Thus, such terms are merely illustrative of the adjustable construction square and are not intended to limit the adjustable construction square to any specific orientation.

BRIEF DESCRIPTION OF THE DRAWINGS

Referring to the drawings which form a part of this original disclosure:

FIG. 1 is a, top plan view of the prior art Patterson U.S. Pat. No. 4,525,933 adjustable T-square with the with the cross member located at a right angle relative to the blade.

FIG. 2 is a, top plan view of the prior art Patterson U.S. Pat. No. 4,525,933 adjustable T-square with the with the cross member at an angle relative to the blade. The prior art Patterson U.S. Pat. No. 4,525,933 adjustable T-square is shown near the peak of a building wall and ceiling.

FIG. 3 is a top plan view of the adjustable construction square of the present invention with the with the cross member at an angle relative to the blade. The adjustable construction square is shown near the peak of a building wall and ceiling. The clamping jig of the present invention is shown also.

FIG. 4 is a partial perspective view of the adjustable construction square of the present invention. Also shown is the clamping jig of the present invention. The components are not assembled.

FIG. 5 is a bottom plan view of the adjustable construction square of the present invention with the cross member at an angle relative to the blade. The clamping jig of the present invention is shown also.

FIG. 5A is a cross sectional view of the blade of the adjustable construction square of the present invention. The view is of section 5A of FIG. 5.

FIG. 6 is a close up bottom plan view of the adjustable construction square of the present invention. This view partially shows the clamping jig of the present invention also.

FIG. 7 is a cross sectional view of the blade of the adjustable construction square of the present invention. Also shown is a partial view of clamping jig. The view is of section 7 of FIG. 6.

FIG. 9 is a close up top view of the cross member part of adjustable construction square of the present invention.

FIG. 10 is a cross sectional view of the blade of the adjustable construction square of the present invention. Also shown is a partial cross sectional view of clamping jig. The clamping jig is not tightened.

FIG. 11 is a cross sectional view of the blade of the adjustable construction square of the present invention. Also shown is a partial cross sectional view of clamping jig. The clamping jig is tightened.

FIG. 12 is a cross sectional view of the cross member of the adjustable construction square of the present invention. Also shown is a partial cross sectional view of clamping jig arm. The clamping jig arm is tightened onto the cross member.

FIG. 13 is a partial close up top view of the blade member part of adjustable construction square of the present invention.

FIG. 14 is a cross sectional view of the blade and the cross member of the adjustable construction square of the present invention. The blade and the cross member are tightened together by a knob.

FIG. 15 is a top plan view of the adjustable construction square of the present invention with the component parts arranged differently than the previous drawings. The clamping jig of the present invention is shown also.

FIG. 16 is a top plan view of the adjustable construction square of the present invention. The clamping jig of the present invention is shown also. The adjustable construction square is in a folded up for acute angle settings and for storage.

PRIOR ART

Figure 8A:
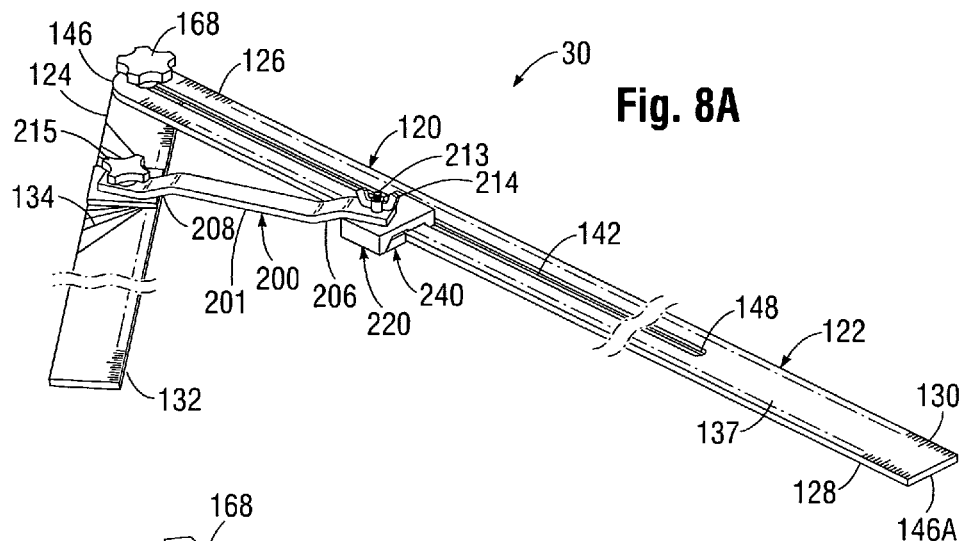
FIG. 8A is a top perspective view of the adjustable construction square of the present invention. The adjustable construction square is set at an angle. This view has the clamping jig attached.

Shown generally at 5 in FIG. 1 is the adjustable T-square 20 of the prior art invention. The invention comprises an elongated blade 22 and an elongated cross member 24. Blade 22 has linear measurement indicia 26 along its top side edges 28, 30. Cross member 24 has both linear measurement indicia 32 and angle measurement indicia 34 on its top surface 36.

Shown generally at 5A in FIG. 1 is the adjustable T-square 20 of the prior art invention. The invention comprises an elongated blade 22 and an elongated cross member 24. Blade 22 has linear measurement indicia 26 along its top side edges 28, 30. Cross member 24 has both linear measurement indicia 32 and angle measurement indicia 34 on its top surface 36. Cross member 24 is set at an angle. As can be seen in FIG. 2 when attempting to measure an angle between a building ceiling 6 and a building wall 7 the adjustable T-square 20 of the prior art invention cannot be placed into the corner 8 of the building. Therefore an accurate angle measurement cannot be made by the adjustable T-square 20 of the prior art invention.

The objects and advantages of the invention will become apparent when the drawings are studied in conjunction with reading the following description and the claims.

DESCRIPTION OF THE PREFERRED EMBODIMENTS

In keeping with the requirements of Patent Laws there is described herein below the best mode of the invention that is currently known to the applicant. For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference now to the drawings, and in particular, to FIGS. 3-16 thereof, the preferred embodiment of the new of adjustable construction square of the present invention. embodying the principles and concepts of the present invention and generally designated by the reference number 10 will be described.

Shown generally at 10 in FIG. 3, the adjustable construction square 120 of the present invention has an elongated blade 122 and an elongated cross member 124. Blade 122 has linear measurement indicia 126 along its opposite longitudinal top side edges 128, 130. Cross member 124 has both linear measurement indicia and angle measurement indicia 134 on its top surface 136. Linear indicia 132 is located along one of the longitudinal side edges of cross member 124.

Blade member has a top surface 137, a bottom surface 138 (not seen) and side walls 140. Linear indicia 126 is located on blade top surface 137. An elongated through slot 142 extends from top surface 137 to bottom surface 138. One end 144 of slot 142 terminates adjacent end 146 of blade 122. The side walls of slot 142 are parallel to side walls 140 of the blade.

Clamping jig 200 has clamping arm 201 that has a first end 202 and a second end 204. Knob stud device 215 fastens clamping arm end 202 to cross member 124. Clamping device 220 is clamped onto blade 122. Clamping jig has stud 216 and sing nut 214.

As can be seen in FIG. 3 when attempting to measure an angle between a building ceiling 6 and a building wall 7 the adjustable construction square 120 invention can be placed into the corner 8 of the building. Therefore an accurate angle measurement can be made by the adjustable construction square 120.

Shown generally at 15 in FIG. 4, the adjustable construction square 120 of the present invention showing parts disassembled. Construction square 120 has an elongated blade 122 and an elongated cross member 124. Blade 122 has rounded end 146. Blade 122 has linear measurement indicia 126 along its opposite longitudinal top side edges 128. Blade member has a top surface 137, a bottom surface 138 not seen) and side walls 140 Linear indicia 126 is located on blade top surface 137. An elongated through slot 142 extends from top surface 137 to bottom surface 138. One end 144 of slot 142 terminates adjacent end 146 of blade. The side walls of slot 142 are parallel to side walls 140 of the blade. Slot 142 has recess 142. A and notch 142B.

Cross member 124 has both linear measurement indicia 132 and angle measurement indicia 134 on its top surface 136. Linear indicia 132 is located along one of the longitudinal side edges of cross member 124. Cross member 124 has rounded end 124A.

Knob 168 has threaded stud 146 that passes through slot 142 of blade 122 and connects into threads 169A of cross member 124 when parts are assembled.

Clamping jig 200 has clamping arm 201 that has a first end 202 and a second end 204. Clamping arm 201 has a hole 202A near first end 202 and a hole 204A near second end 204. Clamping arm 201 has bend 206 and bend 208.

Knob stud device 215 has threaded stud 216 that passes through hole 202A of clamping arm 201 and connects into threads 216A of cross member 124 and fastens clamping arm end 202 to cross member 124 when the parts are assembled.

Clamping device 220 has a first end 222 and a second end 224. Clamping device 220 has a clamping device top surface 226 and a clamping device bottom surface 228. Clamping device 220 has an elongated hole that extends between clamping device top surface 226 and clamping device bottom surface 228. Clamping device has clamping device recess and a clamping device notch. Clamping device 220 has an clamping device angled wall 232.

Clamping wedge device 240 has angled side wall 142 and threaded stud 213. Wing nut 214 connects onto stud 213 when the parts are assembled.

Shown generally at 20 in FIG. 5 is a bottom plan view of the adjustable construction square 120 of the present invention having an elongated blade 122 and an elongated cross member 124.

Blade member has bottom surface 138. An elongated through slot 142 extends from top surface 137 to bottom surface 138. One end 144 of slot 142 terminates adjacent end 146 of blade 122. The side walls of slot 142 are parallel to side walls 140 of the blade. Blade bottom surface has recess 150.

Cross member 124 has rounded end 124A. Knob 168 (not seen) has threaded stud 146 that passes through hole 202A of clamping jig 200 connects into threads 169A of cross member 124 when parts are assembled. Knob 168 has threaded stud 146 that passes through hole 202A pf clamping jig 200 connects into threads 169A of cross member 124 when parts are assembled.

Clamping jig 200 has clamping arm 201 and clamping device 220. Knob stud device 215 fastens clamping arm end 202 to cross member 124. Clamping device 220 is clamped onto blade 122. Clamping jig has stud 216 and wing nut 214.

Shown generally at 22 in FIG. 5A is a cross sectional view of the blade 122 of the adjustable construction square 120 of the present invention. The view is of section 5A of FIG. 5. Blade 122 has recess 142A and notch 142 B.

Shown generally at FIG. 6 is a close up bottom plan view of the adjustable construction square 120 of the present invention. This view partially shows the clamping jig 200 of the present invention also. Clamping jig 220 connects onto blade 122. Threaded stud 213 passes through elongated hole 230 of clamping jig 220.

Shown generally at 24 in FIG. 7 is a cross sectional view of the blade 122 of the adjustable construction square 120 of the present invention. Also shown is a partial view of clamping jig 220. The view is of section 7 of FIG. 6. Blade 122 has recess 142A and notch 142 B. Clamping jig 200 has clamping arm 201 that has a first end 202 (not shown) and a second end 204.

Clamping device 220 has a first end 222 and a second end 224. Clamping device 220 has a clamping device top surface 226 and a clamping device bottom surface 228. Clamping device 220 has an elongated hole that extends between clamping device top surface 226 and clamping device bottom surface 228. Clamping device has clamping device recess 234 and a clamping device notch 236. Clamping device 220 has an clamping device angled wall 232.

Clamping wedge device 240 has angled side wall 242 and threaded stud 213. Wing nut 214 connects onto stud 213. When wing nut 214 is tightened, clamping device notch 236 mates with blade recess 142A.

Shown generally at 30 in FIG. 8A is a top perspective view of the adjustable construction square 120 of the present invention. The adjustable construction square 120 is set at an angle.

An elongated blade 122 and an elongated cross member 124. Blade 122 has linear measurement indicia 126 along its opposite longitudinal top side edges 128, 130. Cross member 124 has both linear measurement indicia 132 and angle measurement indicia 134 on its top surface 136. Linear indicia 132 is located along one of the longitudinal side edges of cross member 124.

Blade member has a top surface 137, a bottom surface 138 (not seen) and side walls 140. Linear indicia 126 is located on blade top surface 137. An elongated through slot 142 extends from top surface 137 to bottom surface 138. One end 144 of slot 142 terminates adjacent end 146 of blade 122. The side walls of slot 142 are parallel to side walls 140 of the blade.

Clamping jig 200 has clamping arm 201. Knob stud device 215 fastens clamping arm end 202 to cross member 124. Clamping device 220 is clamped onto blade 122. Clamping wedge device 240 has threaded stud 213. Wing nut 214 connects onto stud 213.

Figure 8B:
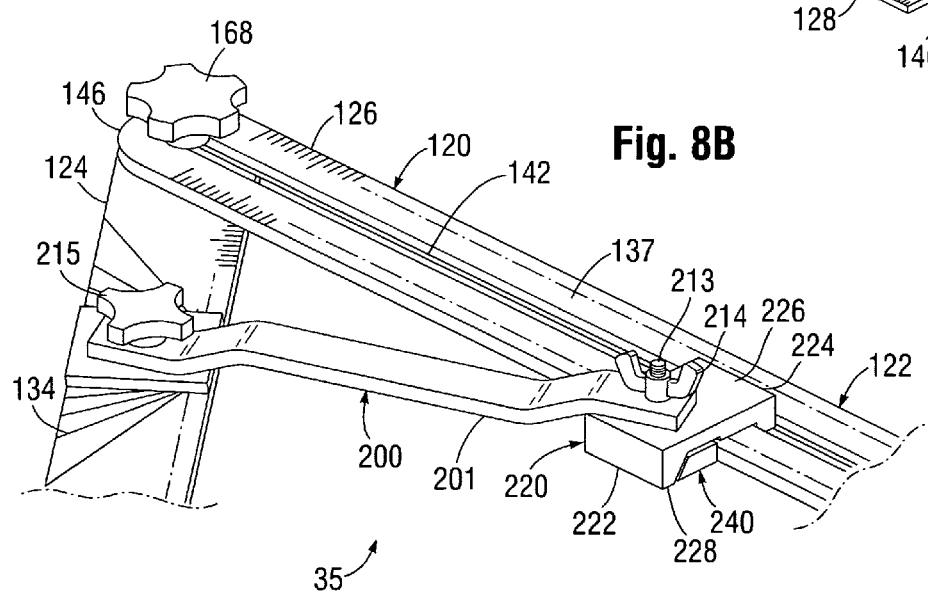
FIG. 8B is a close up top perspective view of the adjustable construction square of the present invention. The adjustable construction square is set at an angle. This view has the clamping jig attached.

Shown generally at 35 in FIG. 8B is a close up top perspective view of the adjustable construction square 120 of the present invention. The adjustable construction square 120 is set at an angle.

An elongated blade 122 and an elongated cross member 124. Blade 122 has linear measurement indicia 126 along its opposite longitudinal top side edges 128, 130. Cross member 124 has both linear measurement indicia 132 and angle measurement indicia 134 on its top surface 136. Linear indicia 132 is located along one of the longitudinal side edges of cross member 124.

Blade member has a top surface 137, a bottom surface 138 (not seen) and side walls 140. Linear indicia 126 is located on blade top surface 137. An elongated through slot 142 extends from top surface 137 to bottom surface 138. The side walls of slot 142 are parallel to side walls 140 of the blade.

Clamping jig 200 has clamping arm 201. Knob stud device 215 fastens clamping arm end 202 to cross member 124. Clamping device 220 is clamped onto blade 122. Clamping device 222 has first end 220 and a second end 224. Clamping device 222 has top surface 226 and a bottom surface 228. Clamping wedge device 240 has threaded stud 213. Wing nut 214 connects onto stud 213.

Shown generally at 45 in FIG. 9 is a close up top view of the cross member 124 of adjustable construction square 120 of the present invention. Cross member 124 has threaded hole 216A thereon.

Shown generally at 50 in FIG. 10 is a cross sectional view of the blade 122 of the adjustable construction square 120 of the present invention. Blade 122 has recess 142A and notch 142B. Also shown is a partial cross sectional view of clamping jig 200. The clamping jig 200 is not tightened.

Clamping jig 200 has clamping arm 201 that has a first end 202 and a second end 204 (not shown). Clamping arm 201 has a hole 202A near first end 202. Clamping arm 201 has bend 206.

Clamping device 220 has a first end 222 and a second end 224. Clamping device 220 has a clamping device top surface 226 and a clamping device bottom surface 228. Clamping device 220 has an elongated hole 230 that extends between clamping device top surface 226 and clamping device bottom surface 228. Clamping device has clamping device recess 234 and a clamping device notch 236. Clamping device 220 has an clamping device angled wall 232.

Clamping wedge device 240 has angled side wall 242 and threaded stud 213. Wing nut 214 connects onto stud 213 when the parts are assembled.

When wing nut 214 is tightened, angled wall 242 of clamping wedge device 240 slides along angled wall 232 of clamping device. As wing nut 214 is further tightened, angled wall 242 of clamping wedge device 240 slides along angled wall 232 of clamping device and forces clamping device notch 236 into recess 242A of blade 122. Elongated hole 230 in clamping device allows stud 213 to move freely in a horizontal direction.

Shown generally at 55 in FIG. 11 is a cross sectional view of the blade 122 of the adjustable construction square 120 of the present invention. Also shown is a partial cross sectional view of clamping jig 200. The clamping jig is tightened. Blade 122 has recess 142A and notch. The clamping jig 200 is tightened. Clamping jig 200 has clamping arm 201 that has a first end 202 and a second end 204 (not shown). Clamping arm 201 has a hole 202A near first end 202 and a hole 204A near second end 204. Clamping arm 201 that has bend 206. Clamping device 220 has a first end 222, and a second end 224. Clamping device 220 has a clamping device top surface 226 and a clamping device bottom surface 228. Clamping device 220 has an elongated hole 230 that extends between clamping device top surface 226 and clamping device bottom surface 228. Clamping device has clamping device recess 234 and a clamping device notch 236. Clamping device 220 has an clamping device angled wall 232.

Clamping wedge device 240 has angled side wall 242 and threaded stud 213. Wing nut 214 is tightened onto stud 213. With wing nut 214 tightened, angled wall 242 of clamping wedge device 24 has slid along angled wall 232 of clamping device and forced clamping device notch 236 into recess 242A of blade 122. Elongated hole 230 in clamping device has allowed stud 213 to move freely in a horizontal direction. With wing nut 214 tightened, the adjustable construction square 120 is secured at the angle desired and will not move to a different setting if bumped accidently.

Shown generally at 60 in FIG. 12 is a cross sectional view of the cross member 124 of the adjustable construction square 120 of the present invention. Also shown is a partial cross sectional view of clamping jig arm 201 of clamping jig 200. The clamping jig arm 201 is tightened onto the cross member 124 when threaded stud 216 is tightened onto cross member 124.

Shown generally at 65 in FIG. 13 is a partial close up top view of the blade member 122 part of adjustable construction square 120 of the present invention. Blade member 122 has rounded end 146 and slot 142.

Shown generally at 70 in FIG. 14 is a cross sectional view of the blade 122 and the cross member 124 of the adjustable construction square 120 of the present invention. The blade 122 and the cross member 124 are tightened together by a knob 168 which has threaded stud attached thereto.

Shown generally at 75 in FIG. 15 is a top plan view of the adjustable construction square 120 of the present invention with the component parts arranged differently than the previous drawings. The clamping jig of the present invention is shown also. This arrangement allows alternate angles to be measured during construction work.

Shown generally at 80 in FIG. 16 is a top plan view of the adjustable construction square 120 of the present invention. The clamping jig of the present invention is shown also. The adjustable construction square 120 is in a folded up position which is suitable for storage or transport.

This invention having been described in its presently contemplated best mode, it is clear that it is susceptible to numerous, variations, modifications, modes and embodiments within the ability of those skilled in the art and without departing from the true spirit and scope of the novel concepts or principles of this invention. Also, it is to be understood that the phraseology and terminology employed herein are for the purpose of description and should not be regarded as limiting. It should be understood that the preferred embodiment has been shown and described and that all changes and modifications that come within the spirit of the invention are desired to be protected. The invention is capable of other embodiments and of being practiced and carried out in various ways. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Accordingly, the scope of the invention is defined by the scope of the following claims.

What is claimed as new and desired to be secured by United States Letters Patent is:

1. An adjustable construction square comprising:
 an elongated blade member having a longitudinal axis, a top surface and a bottom surface; side surfaces; and, an elongated through slot extending along said blade longitudinal axis; said elongated blade having a first end and a second end; said first end of said elongated blade having a contour;
 an elongated cross member having a longitudinal axis; a top surface and a bottom surface; side surfaces; said elongated cross member having a first end and a second end; said first end of said elongated cross member having a contour;
  said first end of said elongated blade is coupled to said first end of elongated cross member;
   a clamping jig that is coupled to said elongated blade member and said elongated cross member; said clamping jig having a clamping jig arm and a clamping device;
 said clamping jig arm having a first end and a second end; said first end of said clamping jig arm is coupled to said elongated cross member; said second end of said clamping jig arm is coupled to said clamping device;
 said clamping device is coupled to said elongated blade;

said clamping device having means for securely tightening said clamping device onto said elongated blade member of said adjustable construction square;
  said clamping device having a first component and a second component; said first component having an angled sidewall; and said second component having has an angled sidewall.

2. An adjustable construction square comprising:
  an elongated blade member having a longitudinal axis, a top surface and a bottom surface; side surfaces; and, an elongated through slot extending along said blade longitudinal axis; said elongated blade having a first end and a second end; said first end of said elongated blade having a contour;
  an elongated cross member having a longitudinal axis; a top surface and a bottom surface; side surfaces; said elongated cross member having a first end and a second end; said first end of said elongated cross member having a contour;
    said first end of said elongated blade is coupled to said first end of elongated cross member;
      a clamping jig that is coupled to said elongated blade member and said elongated cross member; said clamping jig having a clamping jig arm and a clamping device;
  said clamping jig arm having a first end and a second end; said first end of said clamping jig arm is coupled to said elongated cross member; said second end of said clamping jig arm is coupled to said clamping device;
  said clamping device is coupled to said elongated blade;
  said clamping device having means for securely tightening said clamping device onto said elongated blade member of said adjustable construction square;
  said clamping device having an aperture therethrough, said aperture having a long axis and a short axis.

3. The adjustable construction square of claim 2 wherein said clamping device has a threaded stud and threaded fastener that is threaded onto said threaded stud.

4. The adjustable construction square of claim 2 wherein said clamping jig arm has a bend thereon.

5. The adjustable construction square of claim 2 wherein said first end of said clamping jig arm has aperture therethrough and a threaded member extends through said aperture on said first end of clamping jig arm.

6. The adjustable construction square of claim 2 wherein said second end of said clamping jig arm has aperture therethrough and a threaded member extends through said aperture on said second end of said clamping jig arm.

7. The adjustable construction square of claim 2 wherein a threaded member couples said first end of said elongated blade to said first end of elongated cross member.

8. The adjustable construction square of claim 2 wherein said elongated blade member has measuring indicia thereon.

9. The adjustable construction square of claim 2 wherein a threaded member couples said first end of said elongated blade member to said first end of elongated cross member; and said threaded member has a knob thereon.

10. The adjustable construction square of claim 2 wherein said elongated cross member has measuring indicia thereon.

11. An adjustable construction square comprising:
  an elongated blade member having a longitudinal axis, a top surface and a bottom surface; side surfaces; and, an elongated through slot extending along said blade longitudinal axis; said elongated blade having a first end and a second end; said first end of said elongated blade having a contour;
  an elongated cross member having a longitudinal axis; a top surface and a bottom surface; side surfaces; said elongated cross member having a first end and a second end; said first end of said elongated cross member having a contour;
    said first end of said elongated blade is coupled to said first end of elongated cross member;
      a clamping jig that is coupled to said elongated blade member and said elongated cross member; said clamping jig having a clamping jig arm and a clamping device;
  said clamping jig arm having a first end and a second end; said first end of said clamping jig arm is coupled to said elongated cross member; said second end of said clamping jig arm is coupled to said clamping device;
  said clamping device is coupled to said elongated blade;
  said clamping device having means for securely tightening said clamping device onto said elongated blade member of said adjustable construction square;
    said clamping device having a first-component and a second component; said first component having an angled sidewall; and said second component having an angled sidewall;
    said clamping device having an aperture therethrough, said aperture having a long axis and a short axis.

12. The adjustable construction square of claim 11 wherein said clamping device has a threaded stud and threaded fastener that is threaded onto said threaded stud.

13. The adjustable construction square of claim 11 wherein said clamping jig arm has a bend thereon.

14. The adjustable construction square of claim 11 wherein said first end of said clamping jig arm has aperture therethrough and a threaded member extends through said aperture on said first end of clamping jig arm.

15. The adjustable construction square of claim 11 wherein said second end of said clamping arm has aperture therethrough and a threaded member extends through said aperture on said second end of said clamping jig arm.

16. The adjustable construction square of claim 11 wherein a threaded member couples said first end of said elongated blade to said first end of elongated cross member.

17. The adjustable construction square of claim 11 wherein said elongated blade member has measuring indicia thereon.

18. The adjustable construction square of claim 11 wherein a threaded member couples said first end of said elongated blade to said first end of elongated cross member; and said threaded member has a knob thereon.

19. The adjustable construction square of claim 11 wherein said elongated cross member has measuring indicia thereon.

* * * * *